US008554967B2

(12) United States Patent  
Deshpande

(10) Patent No.: US 8,554,967 B2
(45) Date of Patent: Oct. 8, 2013

(54) FLOW CONTROL MECHANISMS FOR AVOIDANCE OF RETRIES AND/OR DEADLOCKS IN AN INTERCONNECT

(75) Inventor: Sanjay Deshpande, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 718 days.

(21) Appl. No.: 12/485,579

(22) Filed: Jun. 16, 2009

(65) Prior Publication Data

US 2010/0318713 A1    Dec. 16, 2010

(51) Int. Cl.
*G06F 13/00* (2006.01)
*G06F 12/00* (2006.01)
*G06F 13/14* (2006.01)
*G06F 13/38* (2006.01)
*G06F 13/28* (2006.01)

(52) U.S. Cl.
USPC ............ 710/100; 710/241; 710/244; 711/141

(58) Field of Classification Search
USPC ................... 710/100, 240–244; 711/141, 210
See application file for complete search history.

(56) References Cited

U.S. PATENT DOCUMENTS

| | | | | |
|---|---|---|---|---|
| 4,825,438 A | * | 4/1989 | Bennett et al. ................... | 714/56 |
| 5,581,713 A | * | 12/1996 | Myers et al. ................... | 710/119 |
| 6,420,901 B2 | * | 7/2002 | Liu et al. ......................... | 326/38 |
| 6,563,922 B1 | * | 5/2003 | Weir .............................. | 379/325 |
| 6,725,307 B1 | | 4/2004 | Alvarez, II et al. | |
| 6,771,596 B1 | * | 8/2004 | Angle et al. ................... | 370/229 |
| 6,823,409 B2 | * | 11/2004 | Jones et al. ................... | 710/107 |
| 6,865,634 B2 | | 3/2005 | McAllister | |
| 6,970,981 B2 | * | 11/2005 | Kanaley ........................ | 711/141 |
| 7,072,817 B1 | | 7/2006 | Carey | |
| 7,139,860 B2 | | 11/2006 | Walker et al. | |

(Continued)

FOREIGN PATENT DOCUMENTS

| | | | |
|---|---|---|---|
| JP | 06059915 A | * | 3/1994 |
| JP | 10027122 A | * | 1/1998 |

(Continued)

OTHER PUBLICATIONS

Definition of "constituent", thefreedictionary.com (citing the American Hertiage Dictionary of the English Language, Fourth Edition, 2000, Houghton Mifflin Company), retrieved from the Internet at http://www.thefreedictionary.com/p/constituent on Feb. 6, 2013, p. 1.*

(Continued)

*Primary Examiner* — Faisal M Zaman
(74) *Attorney, Agent, or Firm* — Haynes and Boone, LLP

(57) ABSTRACT

Flow control mechanisms avoid or eliminate retries of transactions in a coherency interconnect. A class of transaction (CoT) framework is defined whereby individual transactions are associated with CoT labels consistent with chains of dependencies that exist between transactions initiated by any of the cooperating devices that participate in a given operation. In general, coherency protocols create dependencies that, when mapped to physical resources, can result in cycles in a graph of dependencies and deadlock. To support architectural mechanisms for deadlock avoidance, CoT labels are applied to individual transactions consistent with a precedence order of those transactions both (i) with respect to the operations of which such transactions are constituent parts and (ii) as amongst the set of such operations supported in the coherency interconnect. CoT labels applied to respective transactions constitute a CoT framework that may be used by coherency managers to efficiently support concurrent in-flight transactions without retry.

24 Claims, 6 Drawing Sheets

(56) References Cited

U.S. PATENT DOCUMENTS

| | | | |
|---|---|---|---|
| 7,165,094 | B2 | 1/2007 | Weber et al. |
| 7,200,137 | B2 | 4/2007 | Dorr et al. |
| 7,509,671 | B1 * | 3/2009 | Bedell et al. .................... 726/6 |
| 2001/0034771 | A1 * | 10/2001 | Hutsch et al. ................ 709/217 |
| 2005/0003843 | A1 * | 1/2005 | Ho et al. ....................... 455/509 |
| 2005/0154672 | A1 * | 7/2005 | Griffin et al. ................... 705/39 |
| 2006/0136639 | A1 * | 6/2006 | Futral et al. ................... 710/244 |
| 2006/0200456 | A1 * | 9/2006 | Zohar et al. ....................... 707/4 |
| 2007/0174185 | A1 * | 7/2007 | McGoveran ..................... 705/39 |
| 2008/0069129 | A1 * | 3/2008 | Jensen .......................... 370/412 |
| 2008/0162771 | A1 * | 7/2008 | Nicholas ....................... 710/309 |

FOREIGN PATENT DOCUMENTS

| | | | |
|---|---|---|---|
| JP | 11345198 | A * | 12/1999 |
| JP | 2002229943 | A * | 8/2002 |
| JP | 2004280677 | A * | 10/2004 |
| JP | 2010015593 | A * | 1/2010 |
| JP | 2010020599 | A * | 1/2010 |

OTHER PUBLICATIONS

Ciciani, B.; Dias, D.M.; Yu, P.S., "Analysis of concurrency-coherency control protocols for distributed transaction processing systems with regional locality," Software Engineering, IEEE Transactions on, vol. 18, No. 10, pp. 899,914, Oct. 1992.*

Haengrae Cho, "Performance of cache coherency schemes in a shared disks transaction environment," Distributed Computing Systems, 1997., Proceedings of the Sixth IEEE Computer Society Workshop on Future Trends of , pp. 154,161, Oct. 29-31, 1997.*

Dan, A.; Yu, P.S., "Performance analysis of buffer coherency policies in a multisystem data sharing environment," Parallel and Distributed Systems, IEEE Transactions on , vol. 4, No. 3, pp. 289,305, Mar. 1993.*

Shiwei Wang; Hsu, Y., "On integrating control algorithms for buffer management and concurrency for parallel transaction processing systems," VLSI Technology, Systems, and Applications, 1991. Proceedings of Technical Papers, 1991 International Symposium on , pp. 433,438, May 22-24, 1991.*

Lee, J., "Hardware/Software Deadlock Avoidance for Multiprocessor Multiresource System-on-a-Chip", a Thesis Presented to The Academic Faculty-School of Electrical and Computer Engineering Georgia Institute of Technology, Nov. 2004, pp. i-147.

Song, Y and Pinkston, T., "A Progressive Approach to Handling Message-Dependent Deadlock in Parallel Computer Systems", IEEE Transactions on Parallel and Distributed Systems, vol. 14, No. 3, Mar. 2003, pp. 259-274.

* cited by examiner

FLOW CONTROL MECHANISMS FOR AVOIDANCE OF RETRIES AND/OR DEADLOCKS IN AN INTERCONNECT

BACKGROUND

1. Field

This disclosure relates generally to data processing systems, and more specifically, to flow control mechanisms in a coherency interconnect.

2. Related Art

Increasingly complex on-chip interconnect micro-architectures have been developed, in part, to achieve higher data transfer bandwidths and/or lower latencies in system on a chip (SoC) designs. Typically, interconnect fabrics in accord with such micro-architectures seek to provide multi-path, point-to-point communications between a large and scalable set of processor cores, memory controllers, caches, direct memory access (DMA) controllers, bridges, etc. Coherency management techniques are employed to present a coherent system memory state while allowing multiple in-flight interconnect transactions to proceed concurrently in accordance with some appropriate total ordering of transactions. Basic storage operations such as reading or writing of storage locations, synchronization, etc. may be implemented using multiple transactions between two or more end-point devices.

As is well understood in the art, coherency in a multiprocessor system can involve complicated interactions between processor cores, their cache hierarchies and other devices. These interactions typically involve flows of interdependent transactions between entities. In some interconnect designs, particularly those that include a point-to-point interconnect matrix or pipelined busses, large numbers of in-flight transactions may share and compete for interconnect resources. In general, competition amongst transactions that are themselves subject to dependencies can create opportunities for deadlock. Although an impending deadlock can, in practice, often be avoided using retry techniques, frequent retries tend to sap system performance and, in any case, create scenarios that can be very hard to debug.

Techniques are desired to eliminate retries or at least avoid particular situations in which retries might otherwise be employed in a coherency interconnect.

BRIEF DESCRIPTION OF THE DRAWINGS

The present invention is illustrated by way of example and not limitation with reference to the accompanying figures, in which like references generally indicate similar elements or features.

Figure 1:
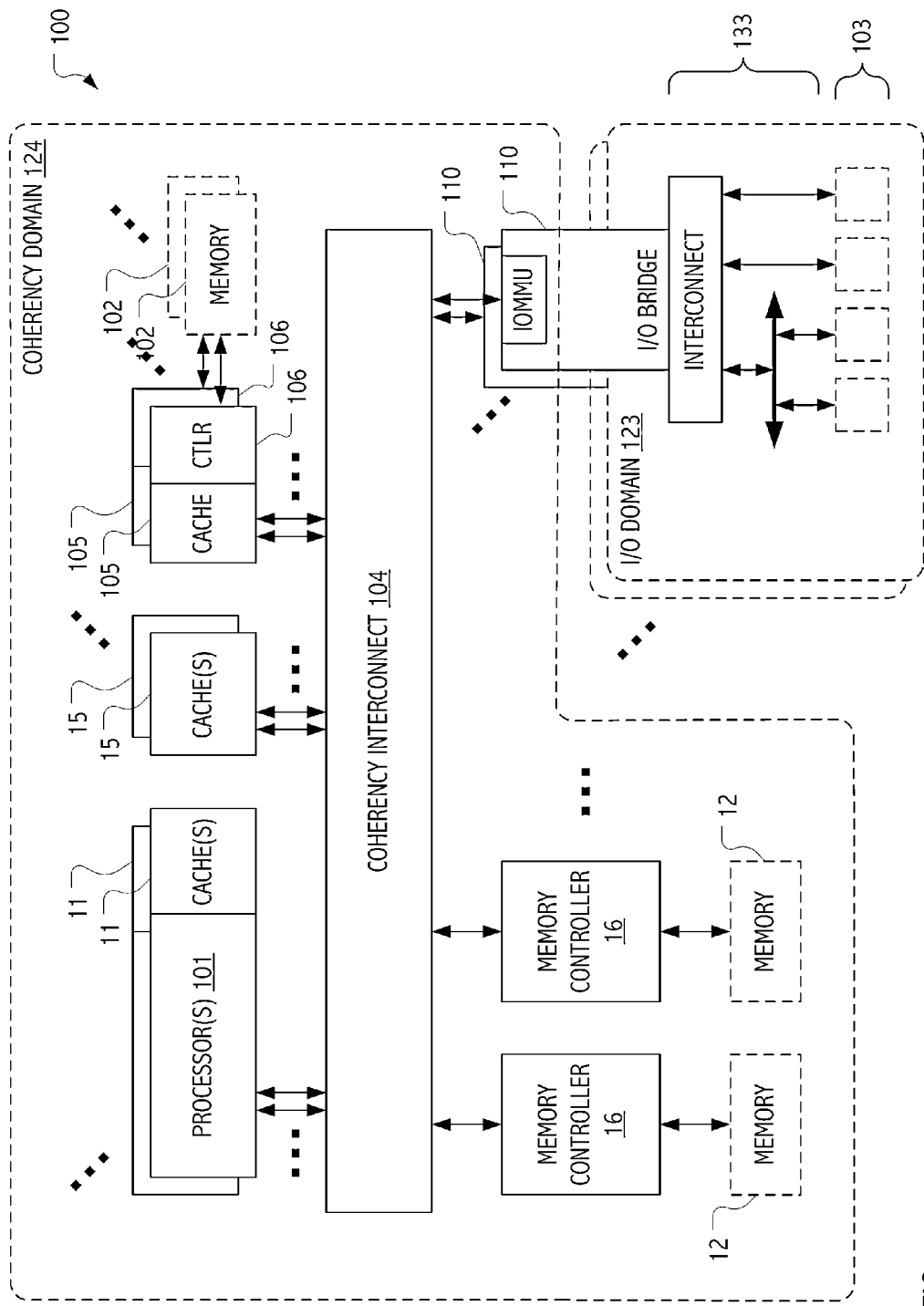
FIG. 1 is a block diagram of a computational system in which a coherency interconnect supports flow control mechanisms in accordance with some embodiments of the present invention.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DETAILED DESCRIPTION

Flow control mechanisms have been developed to avoid, and in some situations or embodiments eliminate, retries of transactions in a coherency interconnect. In particular, a class of transaction (CoT) framework is defined whereby individual transactions are associated with CoT labels consistent with chains of dependencies that exist between transactions initiated by any of the cooperating devices (e.g., processors, targets and interveners) that participate in a given operation. In general, it will be understood that coherency protocols create dependencies that, when mapped to physical resources, can result in cycles in a graph of dependencies and deadlock. To support architectural mechanisms for deadlock avoidance, CoT labels are applied to individual transactions consistent with a precedence order of those transactions both (i) with respect to the operations of which such transactions are constituent parts and (ii) as amongst the set of such operations supported in the coherency interconnect. Taken together, the CoT labels applied to respective transactions constitute a CoT framework that may be used by coherency managers to efficiently support concurrent in-flight transactions without retry.

CoT-denominated request-and-grant protocols are used in some embodiments of the present invention to ensure that dependency chains remain acyclic even when accounting for the potentially competing resource requirements of multiple in-flight operations and their constituent transactions. In some embodiments, request-and-grant mechanisms are employed for address-type transactions that are the initiating transaction constituents of storage-oriented operations supported within a coherency domain, e.g., load operations, store operations, data cache flush operations, translation lookaside buffer (TLB) synchronize operations, etc. For example, a CoT framework that reflects a particular transaction precedence order and an explicit CoT denominated request/grant protocol used for an initiating address-type transaction may be leveraged to ensure that dependency chains remain acyclic. In this way, availability of interconnect resources for all possible successor transactions of any in-flight transaction may be assured. In some embodiments, such assurance may be provided by checking, for a given request (by an initiating device) for a transaction with an associated CoT label of N, where $0 \leq N \leq MAX\_CoT-1$, to ensure that sufficient unallocated interconnect resources exist to complete at least one transaction of each higher class, M, where N<M≤MAX_CoT-1. An implementation may then grant a CoT-denominated transaction request for which resources are available notwithstanding resource requirements of in-flight operations and their constituent transactions (i.e., transactions in flight, together with their possible successor transactions). The grant supplied to the requesting device is itself CoT-denominated and signals unconditional availability of resources (e.g., a buffer) for a transaction of class N. Transactions for which grants are supplied may be initiated by respective requesting devices and are processed in accord with any total ordering imposed by the coherency interconnect.

Depending on the implementation of the coherency interconnect and/or other design factors, CoT-denominated request-and-grant protocols may (or may not) be needed (or used) for other types of transactions. For example, in some embodiments in which sufficient dedicated resources, such as for target and/or coherence responses, can be assured as a matter of architecture or design, transactions requiring such resources may be initiated (as successors to a corresponding addresses-type transaction) without additional CoT-denominated request/grant interactions. Similarly, in some embodiments, a fixed number of successor data transactions (e.g., a single data transaction) follow(s) an initiating address transaction and, as a result, the decision to grant the corresponding device request itself provides a sufficient gating decision point to assure resource availability. Accordingly, in embodiments in which sufficient data path resources may be guaranteed a priori, data transactions may also omit CoT-denominated request/grant interactions.

Note that, notwithstanding the foregoing, for embodiments or interconnect topologies that do or may commingle transactions of multiple types in a given channel (e.g., in a serial bus), omission for non-address-type transactions may not be appropriate. In general, use for any given transaction or transaction type of CoT-denominated request/grant interactions is implementation specific. Nonetheless, for purposes of illustration with respect to certain exemplary embodiments and without limitation, the description herein assumes that address-type transactions employ CoT-denominated request/grant protocols, that address response-type transactions (including target and coherence responses) do not employ CoT-denominated request/grant protocols, and that data-type transactions employ CoT-denominated request/grant protocols optionally with respect to operations for which multiple successive data-type transactions (from a single target) may be employed.

For concreteness of description, we focus on certain illustrative implementations of a coherency interconnect in a computational system with multiple processors, caches, memory controllers, input/output (I/O) bridges, etc. Typically, the coherency interconnect presents bus-type interfaces to a scalable on-chip interconnect fabric that itself employs point-to-point interconnects, crossbars, pipelined buses and/or any other interconnect technologies suitable for the concurrent multipath interconnectivity desired in a particular implementation. In some embodiments, separate paths are provided for different types of transactions, e.g., for address transactions, address response transactions and data transactions. In some embodiments, a coherency domain may span multiple levels of interconnect and/or multiple chips or multichip modules. In general, illustrative implementations described herein include support for a range of variations in form, scalability and features of the coherency interconnect that need not be included in all embodiments. Accordingly, based on the description herein and without limitation, persons of ordinary skill in the art will appreciate applications of the invented techniques to other interconnects and to other computational systems.

For generality, the illustrated implementations are described in a manner that is generally agnostic to design details such as instruction set architecture, I/O device types, operating system conventions, memory and/or coherence models, interconnect technology, communication or data transfer protocols and interfaces employed. Where useful to provide concreteness of description, certain illustrative designs are described, though generally without limitation. Techniques described herein have broad applicability to other interconnects, topologies and computational system designs, but will be understood and appreciated by persons of ordinary skill in the art in the illustrated context. Accordingly, in view of the foregoing and without limitation on the range of interconnects, processor or system architectures, interfaces and coherency domains that may be employed in embodiments of the present invention, we describe certain illustrative embodiments.

System and Integrated Circuit Realizations, Generally

FIG. 1 illustrates a computational system 100 in which devices such as processors 101, memory subsystems (e.g., lookaside cache(s) 105, memory controllers 106 and any associated caches (e.g., caches 15) and memory 102, 12) and I/O facilities (e.g., host bridge 110 and the I/O devices 103 to which it interconnects) are operatively coupled via a coherency interconnect 104. In the illustrated configuration, coherency interconnect 104 includes a scalable on-chip network that is suitable for interconnecting multiple processor cores with memory and I/O subsystems. Processors 101 are linked to each other, to memory 102, 12 and host bridges 110 via the coherency interconnect 104. In some embodiments, coherency interconnect 104 implements a modern front-side multi-path interconnect fabric that supports concurrent non-conflicting transactions and high data rates. Illustrated processors, memory subsystems and I/O facilities, as well as the general character of operations thereamongst, are of any suitable or conventional design.

As a general matter, any of a variety of memory designs and hierarchies may be employed in, or in conjunction with, embodiments of the present invention. Accordingly, FIG. 1 illustrates a superset of caches and memory subsystems that may be implemented in any particular computational system. In particular, the illustrated collection of caches and memory subsystems need not be implemented in all embodiments or, indeed, in any particular embodiment. Rather, FIG. 1 illustrates a collection of caches and memory subsystems that may be employed in range of designs, including those with back-side L2 (processor-associated) caches 11 and those with standalone or lookaside caches 15 that represent state that spans the data and/or instruction spaces of multiple processors 101. In some embodiments, memory controllers 16 interface directly with coherency interconnect 104 and memory (e.g., memory 12). In some embodiments, at least some level of cache 105 is interposed between interconnect 104 and memory (e.g., memory 102 and associated memory controllers 106). For example, in some embodiments, caches 105 are configured as L3 cache and represent state that spans the data and instruction spaces of processors 101, while additional levels of L1 cache (not specifically shown) and L2 cache (e.g., cache(s) 11) are collocated with individual processors or processor cores.

Whatever the collection of caches and memory subsystems implemented in a given design, their operation, together with coherency interconnect 104, will be understood to relative to a coherency domain. In some embodiments consistent with the illustration of FIG. 1, a coherency domain 124 spans a collection of memory subsystems including memory 102, 12 and caches (e.g., the illustrated L2/L3 caches 11, 105 and any other caches or lookaside stores), processors 101, interconnect 104, and I/O host bridges 110 that cooperate through relevant protocols to meet memory coherence, consistency, ordering, and caching rules specific to a platform architecture. For example, in some embodiments, coherency domain 124 conforms to coherence, consistency and caching rules specified by Power Architecture® technology standards as well as transaction ordering rules and access protocols employed in a CoreNet™ interconnect fabric. The Power Architecture and Power.org word marks and the Power and Power.org logos and related marks are trademarks and service marks licensed by Power.org. Power Architecture® technology standards refers generally to technologies related to an instruction set architecture originated by IBM, Motorola (now Freescale Semiconductor) and Apple Computer. CoreNet is a trademark of Freescale Semiconductor, Inc.

Memory addresses can be, and typically are, used to identify storage locations within (or from the perspective of) coherency domain 124. In some cases, a system memory portion of this coherency domain address space is used to address locations in memory 102, 12, while a peripheral memory portion of the coherency domain address space is used for addresses that processors 101 view as assigned to I/O host bridges 110. Using facilities of an I/O memory management unit (IOMMU), the I/O host bridge translates between coherency domain addresses and addresses (or identifiers) for particular I/O devices within a corresponding I/O domain (e.g., I/O domain 123).

In general, cooperation amongst devices (e.g., amongst the processors, memory subsystems and I/O facilities illustrated in FIG. 1) is via coherency interconnect 104 and will be understood in the context of storage operations initiated by some of the devices (typically, processors 101 and I/O bridge 110) relative to addressable locations in target devices (typically, memory 101, 12, I/O Bridge 110 and/or the I/O devices 103 to which I/O Bridge 110 interconnects). For simplicity though without limitation, much of the description herein focuses on storage operations initiated by one of the processors 101 relative to addressable locations in memory 102 with possible intervention (based on cache coherence considerations) by another processor 101. Based on the description herein, persons of ordinary skill in the art will also appreciate operations and interactions consistent with other initiators, targets, memory hierarchies and topologies.

Coherency interconnect 104 supports individual storage operations using sets of constituent transactions that convey atomic units of information between devices. For example, in some embodiments, storage operations are effectuated using a series of separate address transactions, address-response transactions and/or data transactions that are correlated (as part of a unitary storage operation) using consistent tag values. For example, in some embodiments, some storage operations are effectuated using address transactions that convey address information to target devices and to other devices (e.g., processors and caches that snoop address transactions). Address-response transactions then convey target and/or coherence responses from respective targets and snoopers). Finally, data transactions convey addressed data from a target or intervening device (e.g., a cache containing a modified version of a coherency granule or cache line) to or from the requester and/or a memory subsystem. While the set of implemented operations will, in general, be implementation-specific, examples of storage operations in typical embodiments include (without limitation):

load operations initiated by processors (e.g., based on execution on a processor 101 of a load instruction that misses in its associated local cache 11), store operations initiated by processor(s) 101 or I/O devices 103 (via I/O bridge 110), and coherence-oriented operations such as data cache flush operations or translation lookaside buffer (TLB) synchronize operations.

As described herein, such operations may be initiated in coherency interconnect 104 by a requesting device using an appropriate address transaction and completed using subsequent coherency response and data transactions, together with any transactions.

As a general proposition, some devices may act as master-only devices that can initiate address and data transactions, but do not themselves contain addressable memory locations that can be accessed by other devices; some devices may act as target-only devices that contain addressable memory locations that are the targets of address and data transactions, but which do not themselves initiate such transactions; and some devices are combination devices that may act as both initiators and targets of address and data transactions. Often, processors and direct memory access (DMA) engines act as master-only devices, memory subsystems and I/O devices that have addressable memory but no on-board DMA controller act as target devices. In some cases, devices such as a processor that exposes backside memory to other masters or I/O devices that include both addressable storage and DMA facilities may act as combination devices, i.e., as both masters and targets.

In some embodiments, a substantial portion of a computational system such as illustrated in FIG. 1 is implemented as a system on a chip (SoC) and embodied as a single integrated circuit chip. In such configurations, memory 102, 12 and/or a subset of I/O devices 103 or interfaces may be implemented on- or off-chip, while the substantial entirety of illustrated blocks are packaged as an SoC. However, in other embodiments and more generally, portions of computational system 100 may be implemented in or as separate integrated circuits in accord with design, packaging or other requirements.

In some embodiments, computational system 100 is configured as a partitionable multiprocessor system in which storage operations involving particular addressable locations (including I/O device locations) may be confined to a particular partition (or partitions) to which they correspond. In such embodiments, isolation of partitions may be achieved using conventional memory management mechanisms (e.g., MMUs and TLBs, not specifically shown) and using device authorization mechanisms and address and operation type checking performed at an I/O Bridge 110 using facilities of an IOMMU). Although not essential to any particular embodiment, flexible, even dynamic, partitioning of underlying hardware may be facilitated using modern virtualization technologies (e.g., hypervisors) that execute on underlying resources of computational system 100 (e.g., processors 101, memory 102, 12 and I/O devices 103) and expose fractional portions thereof to guest computations (e.g., operating system instances and applications) as virtual machines or partitions. Virtualization technologies are widely employed in modern computational systems and, particularly with regard to processor and memory virtualization, suitable designs and the operation thereof are well understood by persons of ordinary skill in the art. In some embodiments, a firmware-based hypervisor may be employed.

Device Interfaces and Signals

As a general matter, embodiments in accordance with the present invention are envisioned in which signals or information at a transaction layer (e.g., at a layer which corresponds to operations and the constituent transactions which implement such operations) and signals or information at a physical layer need not correspond in a one-to-one manner. Indeed, signals or information at a transaction layer may be represented as independent parallel channels while corresponding signals or information may, at the physical layer, be transmitted, encoded or conveyed using channels or paths that need not precisely correspond to the transaction layer. At least in part for this reason, much of the description that follows refers to physical layer signal paths (such as those that conveyed transactions between devices (e.g., processors 101, on-chip cache memory 105 and I/O bridge 110) and coherency interconnect 104 as links and transaction-oriented subsets of such physical layer signal paths as sub-links.

Of course, collections of multi-bit fields defined for conveyance of transaction information grouped as a sub-link and, indeed collections of information associated with one or more of the constituent sub-links of a link may be jointly encoded, multiplexed or otherwise commingled such as in a serial bus. Nonetheless, for simplicity and clarity (though without loss of generality), the description herein assumes that transactions are signaled in a "native" manner such that physical layer signals correspond one-to-one with signals at the transaction layer. Thus, in the description that follows sub-links correspond, in a one-to-one manner, with groups of multi-bit fields defined for conveyance of particular type of transaction information. Based on the description herein, persons of ordinary skill in the art will appreciate suitable physical layer modifications and extensions for embodiments in which transactions and at least some interfaces are not signaled in a "native" manner. In some embodiments, multiple companion instances of a particular sub-link may be provided.

Operations and Transactions

Some embodiments in accordance with the present invention allow devices interconnected using coherency interconnect 104 (and links thereto and therefrom) to perform several types of storage operations such as reading or writing of storage locations, synchronization, etc. Each operation is effectuated using multiple transactions, or self-contained, atomic units of information, transferred between two or more entities. In general, an operation causes one or more transactions to occur in the system.

In the illustrated embodiments, there are three types of transactions: Address, Address Response, Data. This classification or labeling of transactions carries through to naming conventions adhered to in describing the type of bus or sub-link utilized in transmitting the transaction. Each type of transaction will be understood relative to the corresponding type of bus or sub-link, directed either in or out of the device.

As a general proposition, an operation is submitted by a device into the system as an address transaction. It subsequently incurs multiple address response transactions. Depending on the operation and the current state of the caches in the system, the operation may also incur one or more data transactions. Because an operation starts its life in the system as an address transaction, the operation is often conveniently referred to using the name or type of the initiating address transaction.

An operation that does not incur a data transaction, is informally referred to as an "address-only" operation; one that does is referred to as "address-data operation." Note that since occurrence of data transactions is a function of the state of the system, an operation might be address-only at one time and address-data at another.

The three types of transaction found in CoreNet are described now.

Address transactions are issued for sending the command portion of an operation, e.g., "read" for reading data, "sync" for achieving synchronization, etc.

Data transactions are issued either in response to address transactions, as in the case of a read transaction (for returning data for the read operation) or as transactions accompanying the address transactions, as in the case of a write operation (for delivering data for a memory write operation).

Address Response transactions are issued as responses to address transactions, e.g., for indicating if there was an error in receiving a transaction or reporting a coherency response such as the global status of a coherency granule or cache line.

Some devices like processors can produce all types of transactions, but not all devices are so capable. Broadly speaking, devices that are able to issue address transactions are called "master devices;" those which cannot are called "target devices." Different transactions are issued using the appropriate sub-links. Of course, not all signals or sub-links are required to be implemented by a given device. Neither is full width of a given signal mandatory throughout the system. Depending on the types of transactions supported by a device, it connects to the system only via the signals necessary to receive or issue them. Thus, for example, a device that does not issue an address transaction need not have signals used to control and transmit the out-bound flow of address transactions.

Transactions that correspond to the same operation are correlated with each other. For example, in some embodiments, each such transaction bears a corresponding tag suitable for propagation through the links, interconnect and devices of a computational system and for use by coherency interconnect 104 in correlating related transactions.

Links and Sub-Links

Figure 2:
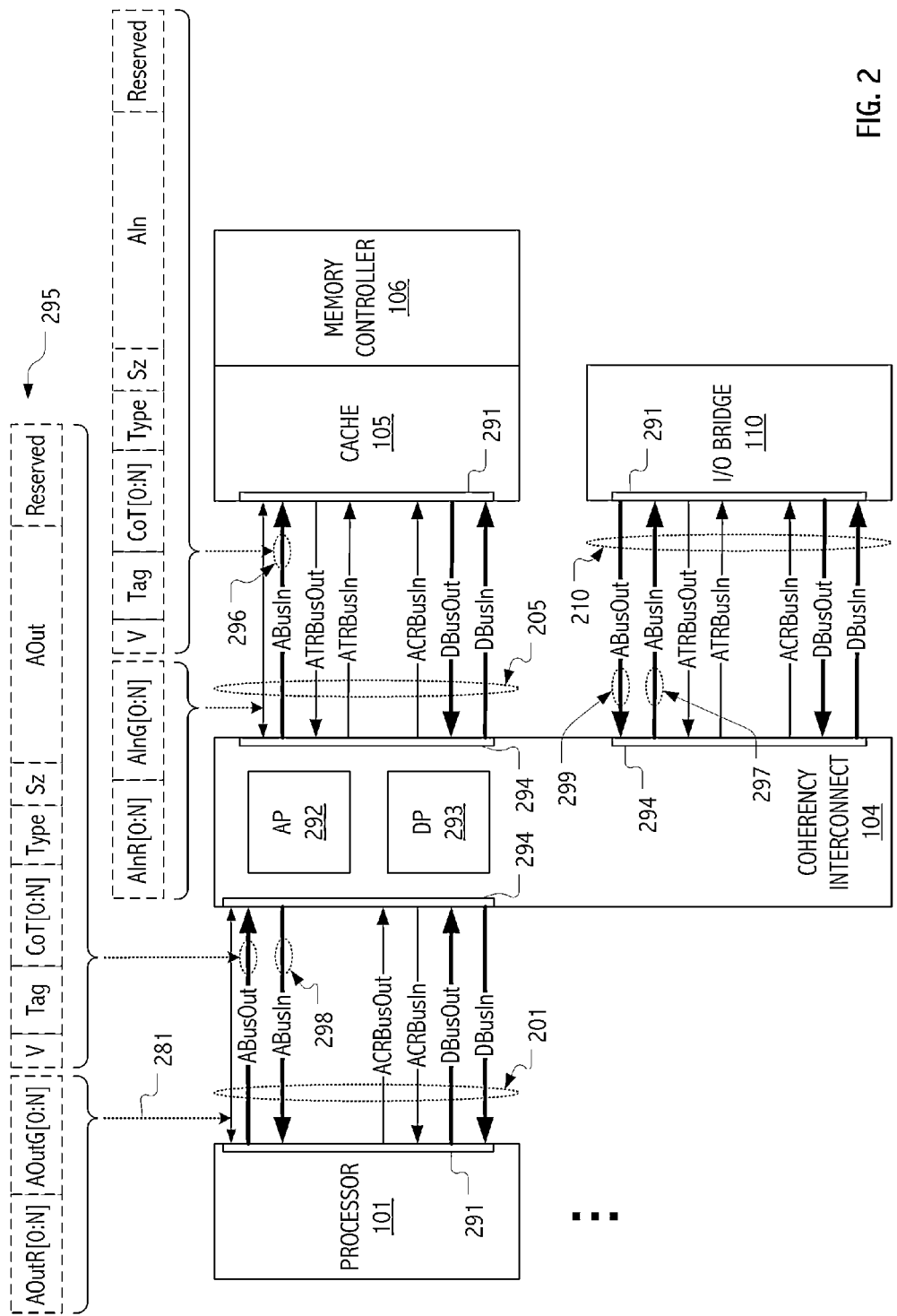
FIG. 2 is a block diagram that illustrates, with emphasis on an exemplary address transaction, links and sub-links between various devices of a computational system that employs a coherency interconnect in accordance with some embodiments of the present invention.

FIG. 2 is a block diagram that illustrates, in further detail and in accordance with some embodiments of the present invention, sub-links and related interfaces between coherency interconnect 104 (on the one hand) and instances of a processor 101, cache 105 and I/O bridge 110 (on the other). In the illustrated configuration, respective bus-type sub-links or signal groups are provided for conveying address transactions (e.g., via instances of sub-links ABusOut and ABusIn), for conveying address response transactions from target devices (e.g., via instances of sub-links ATRBusOut and ATRBusIn), for conveying coherence-type address response transactions from snoopers (e.g., via instances of sub-links ACRBusOut and ACRBusIn), and for conveying data transactions (e.g., via instances of sub-links DBusOut and DBusIn). As shown, respective collections of bus-type sub-links (including device appropriate subsets of the sub-links) define respective point-to-point links 201, 205 and 210 with coherency interconnect 104. For simplicity, bus-type interfaces (e.g., device interfaces 291 and interconnect interfaces 294) are shown collectively for respective collections of sub-links, but may be understood as individual and independent bus-type signaling interfaces for each of the respective sub-links. Note that in FIG. 2 (and those that follow), a device-centric view-point, with ordering points outside the device, is taken in characterizing the In or Out directionality of sub-links.

In the illustrated embodiment, coherency interconnect 104 includes distinct address path 292 and data path 293 portions that convey respective signals or information amongst the interconnected devices. For example, in the course of some storage operations and subject to request/grant protocols described below, signals associated with constituent address transaction are conveyed from processor 101 to coherency interconnect 104 via sub-link ABusOut and respective interfaces. Address path 292 conveys the signals or information for an address transaction to interfaces 294 for appropriate devices (typically including the initiating device, processor 101, addressed target device and any snoop devices) via a pipelined bus, point-to-point or other suitable interconnect path. Respective ABusIn sub-links and device interfaces 291 convey the signals or information to respective devices.

For purposes of illustration, FIG. 2 depicts an example field and signal decomposition 295 of sub-link ABusOut by which an address transaction is conveyed from processor 101 to coherency interconnect 104, including principally an illustrative 6-bit field Type and an illustrative 64-bit field AOut by which the address transaction type, e.g., read, read with intent to modify (RWITM), flush, write for cast out (WCO), etc., and a target memory address are coded. Size field Sz codes the data transfer size, which, if greater than the width provided by the companion sub-link (i.e., sub-link DBusOut or DBusIn, depending on directionality), may require multiple successor data transaction beats. Tag field Tag codes a unique identifier that is conveyed with the address transaction and is propagated by devices and included in corresponding transactions (e.g., in subsequent address response, data and other address transactions) that are constituents of a particular operation. Contents of field Tag are used by coherency interconnect 104 to correlate related transactions. In the illustrated example, individual indications of class of transaction field CoT[0:N] code, in a one-hot format, the class of the particular transaction conveyed on sub-link ABusOut. Note the classes of transactions, together with related request (AOutR[0:N]) and grant (AOutG[0:N]) flow control signals 281 are described in greater detail below. Valid field V, when asserted, indicates that sub-link signals are valid. Other address transaction related sub-links, e.g., sub-links 296, 297 and 298 (ABusIn) and sub-link 299 (ABusOut), are of similar format and include analogous fields.

Likewise for data transactions, signals associated with a data transaction are conveyed from a respective data source (e.g., from a target device such as the memory subsystem illustrated as memory controller 106 and its associated cache 105) to coherency interconnect 104 via corresponding sub-link DBusOut and the associated interfaces. Coherency interconnect 104 receives and buffers the data transactions and conveys same, via data path 293 to interfaces for an appropriate device or devices. In some embodiments, data path 293 implements a crossbar interconnect. Signals associated with a data transaction are delivered to the appropriate device or devices (e.g., to processor 101) via the corresponding DBusIn sub-links and interfaces. Analogous address response signals are conveyed via coherency interconnect 104 and analogous directional sub-links ACRBusOut and ACRBusIn (for coherence responses from snoopers) and ATRBusOut and ATRBusIn (for target device responses).

Class of Transaction Framework

To maintain coherency or due to a resource dependency, a transaction may evoke a successor transaction from another device that must be completed before the original transaction can itself complete. In such a case, the original transaction is a predecessor transaction and is said to be dependent on the successor transaction. Evocation of secondary transactions can be transitive and can lead to a chain of transaction dependencies. In general, the length of any such chain depends on the operation performed and the constituent transactions thereof, but is also a function on the extent and structure of the particular system and the specific underlying protocol employed in it to achieve coherence, consistency, ordering, and other semantics of the storage related operations performed in the system.

Figure 3:
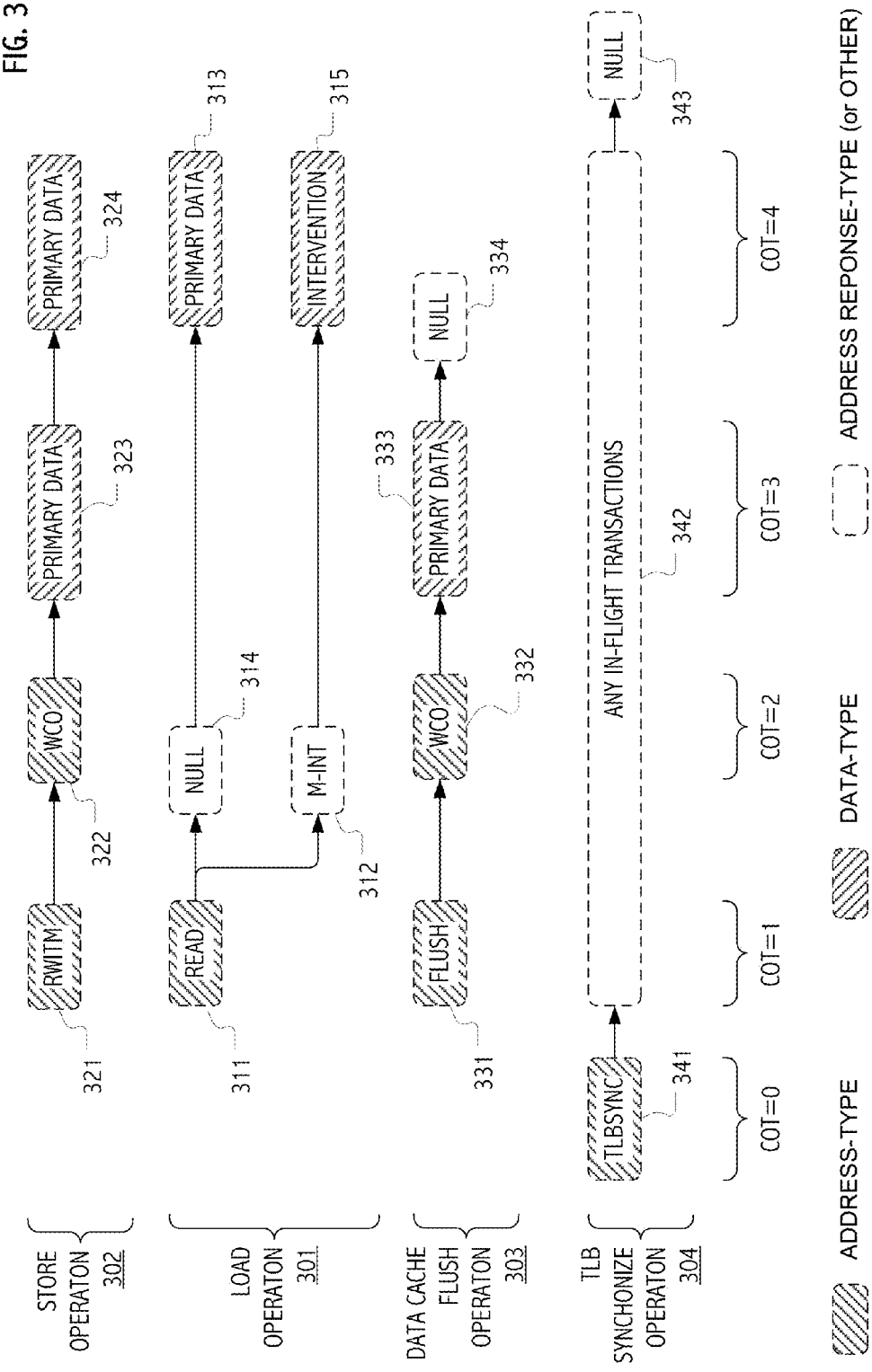
FIG. 3 is a dependency graph that illustrates dependencies amongst constituent transactions of various illustrative operations in a coherency interconnect together with an illustrative assignment of class of transaction (CoT) labels to constituent transactions.

FIG. 3 is a dependency graph that depicts dependencies amongst constituent transactions of various illustrative operations in a coherency interconnect together with an illustrative assignment of class of transaction labels (CoT=0 . . . 4) to constituent transactions in coherence interconnect configurations such as illustrated in FIGS. 1 and 2. In particular, FIG. 3 depicts, in accordance with some embodiments of the present invention, dependencies amongst respective constituent transactions of a load operation 301, of a store operation 302, of a data cache flush operation 303 and of a TLB synchronize operation 304. Other operations may be, and typically are, supported in a given implementation. Likewise, different constituent transactions may be supported in some implementations. Nonetheless, the sets illustrated in FIG. 3 provide a useful descriptive context and, based on the description herein, persons of ordinary skill in the art will appreciate suitable CoT frameworks for larger and/or different set of operation and/or constituent transactions.

Although any of a variety of coding schemes may be employed, in illustrative device and coherency interconnect implementations described herein, transaction information conveyed via sub-links tends to distinguish between transactions based on type and dependencies on possible successor transactions by encoding a class of transaction label CoT, where $0 \leq CoT \leq MAX\_CoT-1$. In general, a sufficient number of distinct CoTs are provided to ensure that a given implementation can apply an ordered set of CoT labels to respective transactions along the longest dependency chain that is possible in a given implementation. For the set of operations and constituent transactions illustrated in FIG. 3, an ordered set of CoT labels $\{0, 1, 2, 3, 4\}$ is sufficient. In other situations or embodiments, larger of small sets of CoT labels may be needed or sufficient.

Resource Independence between CoT Classes

In general, by assigning and applying CoT labels coded using any desirable or suitable scheme, embodiments of the present invention facilitate architectural mechanisms for assuring forward progress or deadlock-freedom properties in coherency interconnect 104 (recall FIGS. 1, 2) and devices interconnected therewith. To accomplish this, implementations should ensure that a given transaction will not be blocked permanently from making progress because of resource conflicts with transactions having lower CoTs. Accordingly, implementations may maintain independence of transactions of different CoTs with respect to the resources they utilize. In general, this implies that a minimum of one resource is reserved for each of the CoTs.

Note that the above requirement does not imply a scheduling policy. An implementation may, for performance consideration, allow a specific CoT transaction to bypass a transaction with a different CoT, or allow a transaction to bypass another transaction with the same CoT, except when explicit ordering is called for.

Resource Independence within a CoT Class

An implementation should also guarantee that no circular resource dependencies can arise within a single class of transaction. That is, no two (or more) transactions of the same CoT should, for want of a resource (or resources), be dependent upon each other such that neither (or none) can complete. Depending on the structure of the system, in order to prevent circular resource dependencies between transactions of the same CoT and thus prevent deadlock, the system may be required to have certain minimum number—greater than 1—of resources reserved for a particular CoT. For example, in a computational system in which each of N devices may initiate remote snoop requests (for which a particular CoT=X is assigned) with respect to addressed locations that may be cached by its peers, it may be necessary for a coherency interconnect to reserve for any particular device, N-1 resources suitable for completion of a CoT=X transaction. In this way, flow controls may assure that any given operation that is allowed to initiate and includes in its dependency chain snoop requests directed to its peers may complete and not block progress of its peers. Alternatively, in some cases, an implementation may simply increase the number of CoT classes to accommodate in a piecewise manner the minimum number of resources that must be reserved for a given CoT.

By assigning CoT labels in a manner that captures dependencies amongst transactions and assures sufficient resources for completion of all successor transactions upon which a give transaction depends, it is possible to provide flow controls that preclude cyclic chains of dependencies amongst transactions due to resource constraints and which therefore avoid system deadlock without retries. To provide architectural support for the foregoing, some embodiments of the present invention require that:

CoT(Predecessor transaction)<CoT(Successor transaction).

Where the transactions assigned the highest class, i.e., CoT=MAX_CoT-1, must not evoke any other transactions. In general, transactions that do not evoke successor transactions, and which therefore have no further dependent transactions, are termed terminal transactions. Remaining transactions are termed non-terminal transactions. Based on the foregoing, it will be understood that transactions assigned the highest class must be terminal transactions. However, the terminal transaction of any given operation need not be of the highest class.

While the ordering of CoTs illustrated with respect to the described embodiments herein is from a lowest ordinal to a highest, such ordering is simply a matter of convention and other embodiments may adopt other conventions. In general, the number of CoTs needed in a computational system is dictated by the longest transaction dependency chain that might occur. However, the actual number of CoTs employed or exposed in a system may be affected by implementation-dependent factors. For example, it is possible for a given implementation of coherency interconnect 104 and interconnected devices to not expose some transaction dependencies architecturally via the CoT assignments, but rather to provide for them in appropriate resource allocation policies. In some embodiments, dependency chains (or resource allocation policies) also account for dependencies created by I/O ordering rules, if any.

In general, devices are nominally expected to manage their own internal resources as necessary to guarantee forward progress for any transactions it originates and the secondary transactions that might arise as side effects of the original transactions. An example of this is a write with cast out (WCO) transaction that might arise within a processor as a result of a read transaction that replaces a modified coherency granule or cache line. If a device is unable to manage its own internal resources, embodiments of the present invention may seek to accommodate through increase the number of CoT labels supported and higher system complexity.

Finally, a device is expected to be aware of and use the number of different CoTs it needs for its transactions but not necessarily the allocation of those CoTs within the CoT mapping employed by the overall system. Thus, a device may label transactions that it initiates with CoTs according to a locally consistent scheme (e.g., starting at 0 and defining only locally-valid labels) as long as a consistent mapping from the device's CoT labeling scheme to system CoTs may be performed in the connectivity between the device and the coherency interconnect.

Turning again to FIG. 3, dependencies amongst possible chains of successive constituent transactions are depicted together with assigned CoT labels for various illustrative operations in a coherency interconnect (such as coherency interconnect 104). In particular, relative to the possible constituent transactions of store operation 302, it will be understood that an initiating address-type transaction (here a read with intent to modify, RWITM, transaction 321 may be used to secure modify access to a coherency granule corresponding to an addressed memory location, whereupon a successor address-type transaction (here a write with cast out, WCO, transaction 322) actually initiates the write to memory which is completed with data committed to memory using data-type transaction 323. Finally, a second data-type transaction 324 conveys data from the targeted location to devices that cache contents of the corresponding coherency granule. To properly order the successive transactions along the dependency chain for store operation 302 while accommodating a CoT=0 label for TLBSYNC transaction 341, RWITM transaction 321 is labeled as a CoT=1 and successive WCO (322) and data transactions (323, 324) are labeled (in accord with the illustrated precedence order) as CoT=2, CoT=3 and CoT=4, respectively.

With respect to possible constituent transactions of load operation 301, it will be understood that, following an initiating address-type transaction (here a read transaction 311 that conveys a memory address from a processor device to a target device and to one or more snoop devices), two possibilities present. In some situations, a coherency response (illustrated by a modified-intervention, M-INT, address-response-type transaction 312) is supplied from a snoop device signifying that the corresponding cache currently has a copy of the coherency granule that is modified with respect to memory. In such case, an intervention data-type transaction 313 conveys the modified data from the intervening cache to the processor that initiated read transaction 311. In some situations, a null response (illustrated by NULL, address-response-type transaction 314) signifies that the read may be satisfied from the target memory subsystem and primary data-type transaction 315 conveys the addressed data from the target device to the processor that initiated read transaction 311.

Successive transactions along the illustrated dependency chain for load operation 301 are labeled in a manner consistent with the labeling applied for possible dependency chains associated with store operation 302 and accommodating a CoT=0 label for TLBSYNC transaction 341. In particular, initiating address-type READ transaction 311 is labeled as a CoT=1 and primary data-type transaction 315 and intervention data-type transaction 313 are each labeled as CoT=4, in accord with the illustrated precedence order and consistent with CoT labeling of similarly situated data transaction 324 of store operation 302.

Constituent transactions of data cache flush operation 303 include an initiating address-type transaction (here a flush transaction 331) that conveys a memory address from a processor device to a target device that caches the coherency granule and to one or more snoop devices, whereupon a successor address-type transaction (here a write with cast out, WCO, transaction 332) actually initiates the write of cached date to memory using data-type transaction 333. A NULL address-response-type transaction 334 signifies completion relative to the initiating flush transaction 331.

As before, successive transactions along the illustrated dependency chain for data cache flush operation 303 are labeled in a manner consistent with the labeling applied for possible dependency chains associated with store operation 302 and in a way that accommodates a CoT=0 label for TLBSYNC transaction 341. In particular, initiating address-type FLUSH transaction 331 is labeled as a CoT=1, while successive WCO transaction 332 and its corresponding primary data transaction 333 are labeled (in accord with the illustrated precedence order) as CoT=2 and CoT=3, respectively.

Finally, TLB synchronize operation (TLBSYNC) address transaction 304 is labeled as CoT=0 because completion of a TLBSYNC requires completion of all in-flight active transactions in the computational system that may have utilized previous page table translations. Since a given instance of TLBSYNC transaction 304 may depend upon transactions of any of the other operations supported which may be in-flight, a label of CoT=0 properly codes the possible dependency on transactions labeled as CoT=1, CoT=2, CoT=3 or CoT=4. Building on the acyclic precedence orders of transactions and a framework of CoT labels such as illustrated in FIG. 3, persons of ordinary skill in the art will appreciate flow controls implemented in some embodiments of coherency interconnect 104.

Transaction Flow Control

Figure 4:
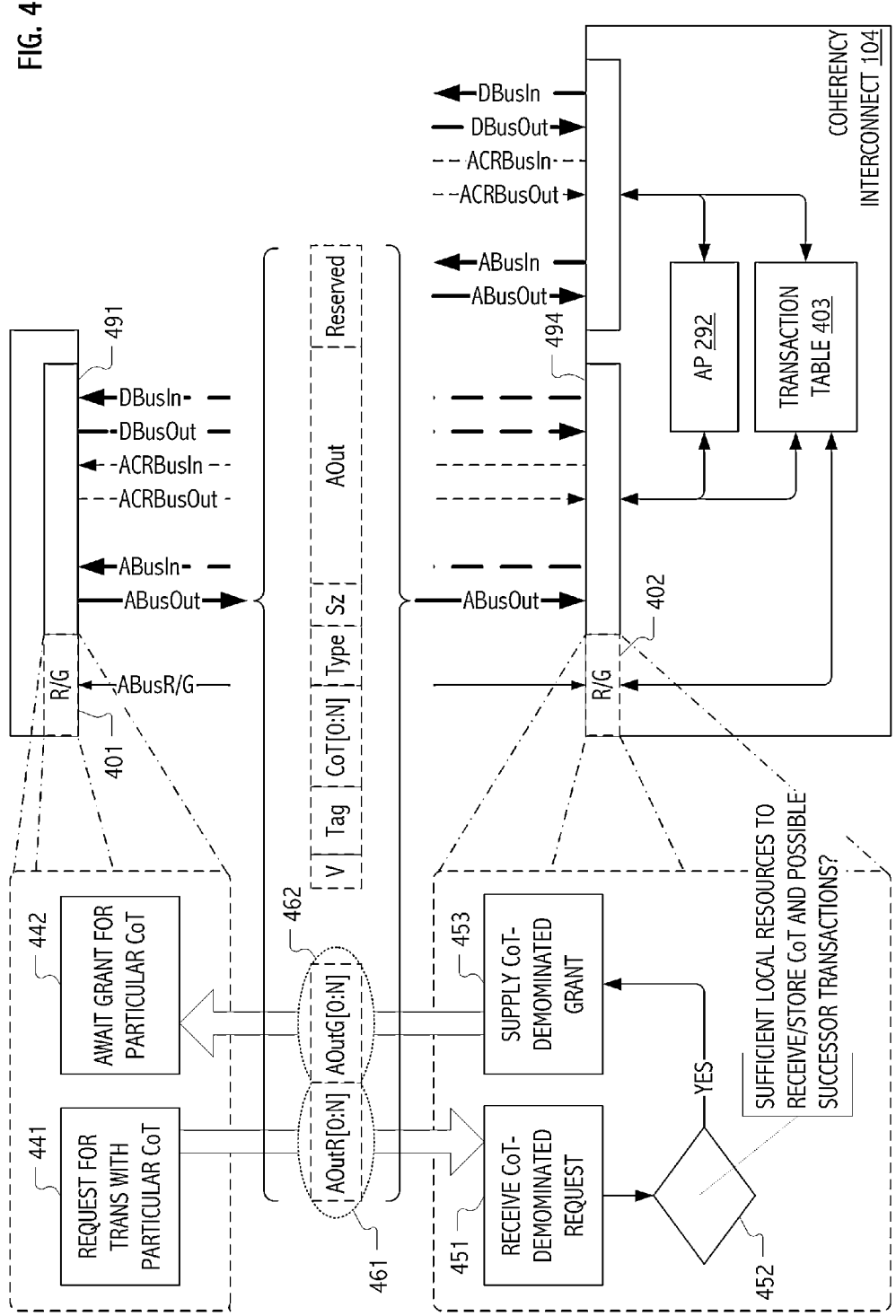
FIG. 4 is a combined block diagram and flow chart illustrating use of a class of transaction (CoT) denominated request-grant protocol employed in some embodiments of the present invention.

Referring now to FIG. 4, transaction flow controls are illustrated for an address-type transaction initiated by processor 101 via sub-link ABusOut of link 201 with coherency interconnect 104. As before, an example field and signal decomposition 295 is illustrated. Field definitions and variations remain consistent with those described with reference to FIG. 2, while request and grant signals and logic for flow control on sub-link ABusOut are illustrated in further detail.

As a general proposition, linked entities such as processor 101 and coherency interconnect 104 may be required (in some embodiments) to seek permission of the other to send transactions over unidirectional address and data buses (e.g., over illustrated sub-links ABusOut, ABusIn, DBusOut and DBusIn using a flow control mechanism such as may be provided using request and grant signals. Entities each include flow control units that process these requests and issue grants based on the local resource status. After receiving the grant signal, the requester may drive the corresponding bus signals and effect the sending of a transaction. Although flow controls may be applied for any transaction or sub-link and for any of a variety of purposes including throttling based on local load or resource states, the primary focus of the present description is on use of a CoT-denominated request-grant mechanism and protocol relative (primarily) to address-type transactions that initiate an operation (and the possible sequences of successive transactions that are constituents of such an operation).

Accordingly, for purposes of clarity and specificity, the description focuses on CoT-denominated requests and grants used relative to initiating address-type transactions that a device (e.g., processor 101) seeks to convey to coherency interconnect 104 via a corresponding sub-link ABusOut. Other requests and grants (including, in some cases, CoT-denominated requests and grants) may be used for other sub-links and for other devices. However, relative to a framework of CoT labels selected and applied as described above and with reference to FIG. 3, persons of ordinary skill in the art will appreciate the attractiveness of making control flow decisions, i.e., providing CoT-denominated grants in response to CoT-denominated requests, based on the CoT for an initiating address-type transaction. In this way, consistent with assumptions encoded in the CoT framework, coherency interconnect 104 may (1) consider a request based (implicitly) on compatibility of the requested transaction and its possible successors availability of interconnect resources required therefor and (2) reserve those required resources in conjunction with a corresponding grant.

Thus, FIG. 4 illustrates a device, here processor 101, requesting (441) to drive sub-link ABusOut with a transaction of CoT[i], where $0 \leq i \leq MAX\_CoT-1$. In general, a device may concurrently assert CoT-denominated requests for multiple values i and coherency interconnect 104 may assert (concurrently or otherwise) corresponding grants for one or more of the multiple values i; however, for simplicity of description, a single request is considered. Persons of ordinary skill in the art will appreciate extrapolations to multiple concurrent requests. In any case, request-grant logic 401 of processor 101 awaits (442) a CoT-denominated grant from its link partner, coherency interconnect 104. Some time after the signal ABOutR[i] is asserted and received (451), an arbiter of request-grant logic 402 checks (452) to ensure that given CoT denominated transactions already in-flight and resources reserved therefor (including for possible successors), sufficient resources remain unallocated to allow a transaction of the class requested by signal ABOutR[i] together with its possible successors to complete, and if so, asserts (453) the corresponding signal ABOutG[i]. Sometime subsequent to the assertion of ABOutG[i], the address transaction is conveyed from processor 101 to coherency interconnect 104 over sub-link ABusOut.

Although any of a variety of mechanisms may be employed at coherency interconnect 104 to facilitate arbitration by request-grant logic 402, one straightforward implementation preferentially grants higher CoT requests prior to considering lower CoT requests and assumes in its decision logic, for a request signal ABOutR[i], that coherency interconnect 104 must have sufficient unreserved resources to satisfy a transaction at CoT[i] and at every CoT. In general, reservations of resources may be explicitly encoded in transaction table 403 (or elsewhere) or may be implicit based on resources associated (or associable) with a set of in-flight transactions specifically represented in transaction table 403 (or elsewhere) and potential successors of such specifically represented transactions and resources associated (or associable) therewith. If sufficient resources are available, decision logic issues the corresponding grant signal ABOutG[i] and update transaction table 403 (or any other suitable store) to reflect the explicit or implicit reservation of resources.

In the illustration of FIG. 4, CoT-denominated requests are represented (461) in a positionally-encoded format AOutR[0:N] where each asserted position encodes a request to initiate an address transaction of the corresponding CoT on sub-link ABusOut. Likewise, CoT-denominated grants are represented (462) in a positionally-encoded format AOutG[0:N] where each asserted position encodes grants for address transactions of the corresponding CoT on sub-link ABusOut. In some embodiments, CoT-denominated grants are unconditional and allow a device, e.g., processor 101, to initiate an address transaction via sub-link ABusOut at a future time of its choosing. In general, no transmission window need be required and if a device, e.g., processor 101, has received multiple CoT-denominated grants (potentially for transactions of differing CoTs), it may initiate corresponding address transactions in orders and at future times of its selection. Address transactions, when eventually presented on sub-link ABusOut, based on a then outstanding CoT-denominated grant, encode the corresponding CoT-label.

Ordering of Transactions

Figure 5:
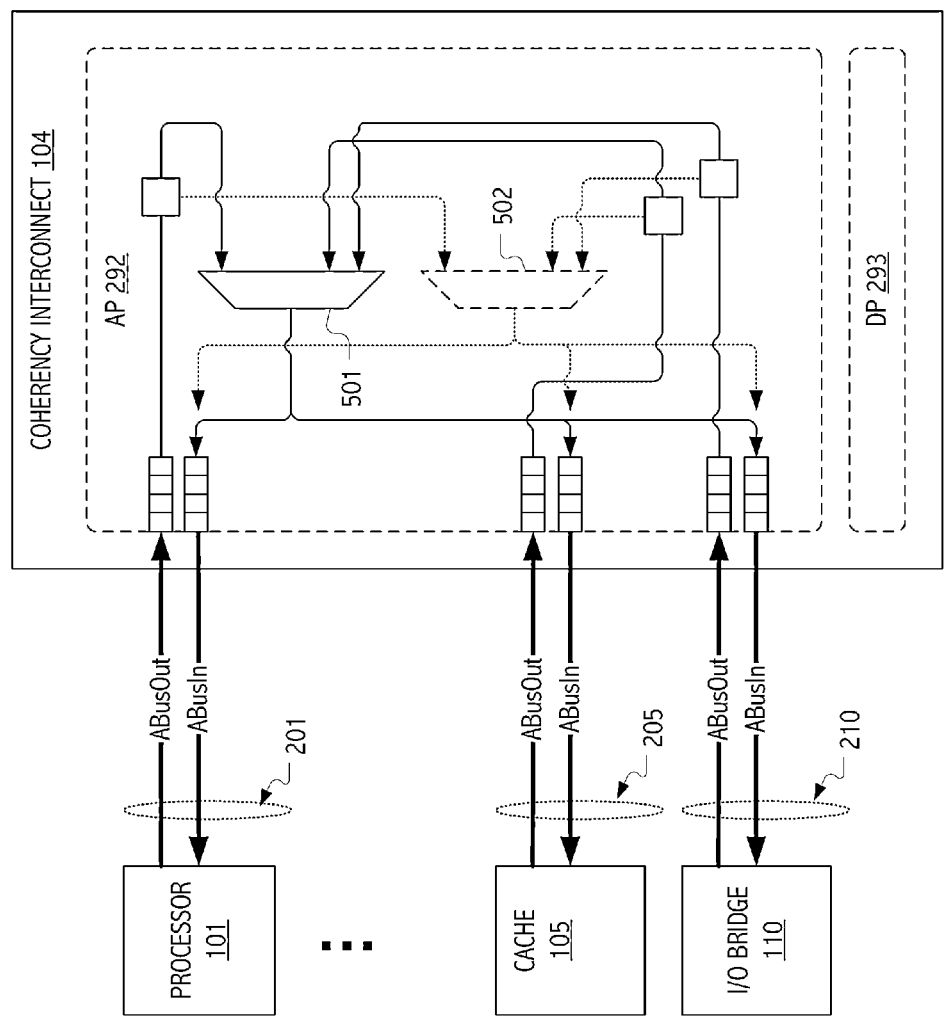
FIG. 5 is a block diagram that illustrates address transaction ordering in an address path portion of a coherency interconnect in accordance with some embodiments of the present invention.

Once a device has successfully navigated the above-described request-grant protocol and presented its address transaction on a corresponding sub-link ABusOut, the transactions are subject to ordering at coherency interconnect 104. FIG. 5 illustrates ordering points 501, 502 employed in and address path 292 of some implementations of coherency interconnect 104. In particular, coherency interconnect 104 receives and buffers incoming address transactions, including instances of address transactions (such as RWITM, READ, FLUSH and TLBSYNC transactions, recall FIG. 3) that initiate operations in coherency interconnect 104. Address path 292 includes two ordering points 501, 502 that, subject to some appropriate discriminator, have purview over respective subsets of received address transactions. For example, in some embodiments, address transactions targeting distinct portions of an address space may be ordered separately, e.g., using ordering point 501 to order transactions that target a first portion of the coherency domain and using ordering point 502 to order transactions that target a second portion). In some embodiments, only a single ordering point may be provided.

In general, address transactions received from a particular device (e.g., from processor 101, cache 105, or I/O bridge 110), are supplied to a target of the address transaction and to any appropriate snoop devices via corresponding sub-links ABusIn. For simplicity of illustration, other sub-links are omitted in FIG. 5. Ordering imposed by ordering point 501 and/or ordering point 502 may be in accord with any suitable or desirable transaction ordering framework. For example, ordering may be in accord with ordering semantics defined for the Power Architecture (i.e., nominally weakly ordered, but with strong ordering enforced on demand via explicit synchronization operations) or in accord with ordering semantics specified by a peripheral component interconnect (PCI) Local Bus Specification or in accord with AXI semantics. In some embodiments, an operant ordering framework may be specified by the initiating device (e.g., processors 101).

Data Transactions

Figure 6:
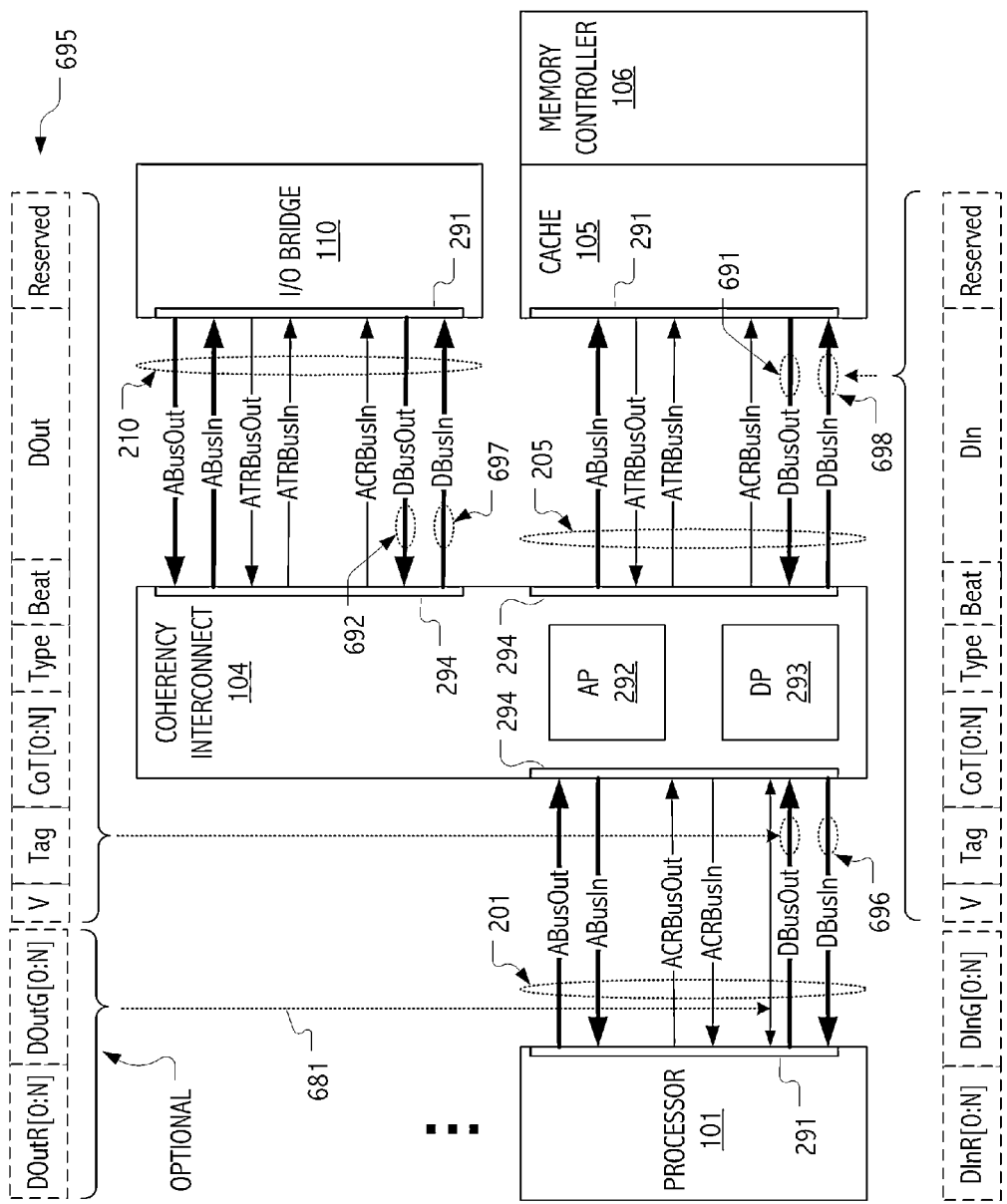
FIG. 6 is a block diagram that illustrates, with emphasis on an exemplary data transaction, links and sub-links between various devices of a computational system that employs a coherency interconnect in accordance with some embodiments of the present invention.

As previously described, class of transaction CoT labels may optionally be applied to data transactions in some embodiments of the present invention. FIG. 6 illustrates, relative to an exemplary data transaction coding format 695, sub-links and related interfaces between coherency interconnect 104 (on the one hand) and instances of a processor 101, cache 105 and I/O bridge 110 (on the other). As before, respective bus-type sub-links or signal groups are provided for conveying address transactions (e.g., via instances of sub-links ABusOut and ABusIn), for conveying address response transactions from target devices (e.g., via instances of sub-links ATRBusOut and ATRBusIn), for conveying coherence-type address response transactions from snoopers (e.g., via instances of sub-links ACRBusOut and ACRBusIn), and for conveying data transactions (e.g., via instances of sub-links DBusOut and DBusIn). Also as before, respective collections of bus-type sub-links (including device appropriate subsets of the sub-links) define respective point-to-point links 201, 205 and 210 with coherency interconnect 104. For simplicity, bus-type interfaces (e.g., device interfaces 291 and interconnect interfaces 294) are shown collectively for respective collections of sub-links, but may be understood as individual and independent bus-type signaling interfaces for each of the respective sub-links.

In the course of some storage operations and subject to request/grant protocols that may, in some embodiments, be applied to data transactions, signals associated with a particular data transaction are conveyed from processor 101 to coherency interconnect 104 via sub-link DBusOut and respective interfaces. Data path 293 conveys the signals or information for an address transaction to interfaces 294 for appropriate devices (typically the addressed target device) via a crossbar interconnect, pipelined bus or other suitable interconnect path. Respective DBusIn sub-links and device interfaces 291 convey the signals or information to the target device (or devices).

As with previously described address transaction codings, FIG. 6 depicts an example field and signal decomposition 695 of sub-link DBusOut by which a data transaction is conveyed from processor 101 to coherency interconnect 104, including principally an illustrative field Type and DOut by which the data transaction type, e.g., primary data, intervention data, etc., and at least a portion of a data payload are coded. Field Beat codes a beat index for data transfers that, based on the data transfer size, may require multiple data transactions. In general, a beat index need not be provided unless the width provided by the DBusOut sub-link (or analogously by sub-link DBusIn) is insufficient to convey the data payload in a single transaction beat. In some embodiments, a size field may be employed. Tag field Tag codes a unique identifier that is conveyed with the data transaction and is propagated by devices and included in corresponding transactions (e.g., in subsequent address response, data and other address transactions) that are constituents of a particular operation. Contents of field Tag are consistent across address, address response and data transactions that are constituents of the same operation and are used by coherency interconnect 104 to correlate related transactions.

An optional class of transaction label CoT[0:N] codes, in a one-hot format, the class of the particular transaction conveyed on sub-link DBusOut. In embodiments that implement CoT labels for data transaction, related request (DOutR[0:N]) and grant (DOutG[0:N]) flow control signals 681 may be provided and employed in a manner analogous to request-grant signals and in accord with protocols analogous to those described above (with reference to FIG. 4 and address transactions). Valid field V, when asserted, indicates that sub-link signals are valid. Other data transaction related sub-links, e.g., sub-links 696, 697 and 698 (DBusIn) and sub-link 691 and 692 (DBusOut), are of similar format and include analogous fields.

Other Embodiments

Although the invention is described herein with reference to specific embodiments, various modifications and changes can be made without departing from the scope of the present invention as set forth in the claims below. For example, while techniques have been described in the context of illustrative devices, interfaces, topologies and signals, the described techniques have broad applicability designs in which other or additional devices, interfaces, topologies and signals are supported. Class of transaction (CoT) techniques and labels have been described as an ordered set of values that may span transaction types (e.g., address and data transactions alike). However, more generally, CoTs can be represented as an n-tuple and the CoT space could be multi-dimensional, each element in the tuple corresponding to the distinct type of resource needed by the transactions. Furthermore, although embodiments detailed herein map the transaction (of multiple types) to a single linear order of classes, multiple subsets (e.g., one subset representing address transaction related resources and the another subset representing data transaction related resources) may be implemented or supported in other embodiments.

Embodiments of the present invention may be implemented using any of a variety of different information processing systems. Of course, architectural descriptions herein have been simplified for purposes of discussion and those skilled in the art will recognize that illustrated boundaries between logic blocks or components are merely illustrative and that alternative embodiments may merge logic blocks or circuit elements and/or impose an alternate decomposition of functionality upon various logic blocks or circuit elements.

Articles, systems and apparati that implement the present invention are, for the most part, composed of electronic components, circuits and/or code (e.g., software, firmware and/or microcode) known to those skilled in the art and functionally described herein. Accordingly, component, circuit and code details are explained at a level of detail necessary for clarity, for concreteness and to facilitate an understanding and appreciation of the underlying concepts of the present invention. In some cases, a generalized description of features, structures, components or implementation techniques known in the art is used so as to avoid obfuscation or distraction from the teachings of the present invention.

Finally, the specification and figures are to be regarded in an illustrative rather than a restrictive sense, and consistent with the description herein, a broad range of variations, modifications and extensions are envisioned. Any benefits, advantages, or solutions to problems that are described herein with regard to specific embodiments are not intended to be construed as a critical, required, or essential feature or element of any or all the claims.

What is claimed is:

1. A method of controlling transaction flow in an event-based coherency interconnect operatively coupled between devices to support operations amongst the devices relative to a coherency domain of addressable memory locations, the method comprising:
   associating class of transaction (CoT) labels with constituent transactions of the supported operations, wherein the CoT labels associated with respective constituent transactions of a particular supported operation differ, but are in accordance with an acyclic precedence order of the constituent transactions;
   receiving transaction requests from devices linked to the coherency interconnect, wherein, for at least address-type ones of the received transaction requests, the received transaction requests each specify a CoT label;
   the coherency interconnect supplying CoT labeled grant indications in correspondence with, and responsive to, a subset of the received, CoT labeled transaction requests, wherein by supplying a particular CoT labeled grant indication to a particular requesting device, the coherency interconnect grants unconditional availability of a buffer for a transaction of the corresponding class from the particular requesting device.

2. The method of claim 1, further comprising:
   wherein the subset of received, CoT labeled transaction requests for which corresponding CoT labeled grant indications are supplied is based on decision logic that ensures that, if a particular one of the received transaction requests is granted, interconnect resources are available for the particular transaction requested and for all possible successor transactions thereof after accounting for current and possible successor transactions that are constituents of uncompleted operations already in flight in the coherency interconnect.

3. The method of claim 1, further comprising:
   receiving from the particular requesting device, a transaction that corresponds to the particular CoT labeled grant indication; and
   at the coherency interconnect, ordering the received transaction relative to at least a subset of other received transactions.

4. The method of claim 3,
   wherein the received and ordered transaction is an address transaction, the method further comprising:
   presenting the address transaction to a target device; and
   presenting the address transaction to at least one snoop device.

5. The method of claim 4,
   wherein the other received transactions include one or more of:
   other address transactions from other requesting devices; and other address transactions destined for other target devices.

6. The method of claim 3, further comprising:
   presenting ordered subsets of the received transactions to respective ones of the devices, wherein, at least for transactions targeting addressable memory locations of a same coherency granule, ordering of the received transaction subsets presented to any particular device is in accord with a total ordering imposed by the coherency interconnect.

7. The method of claim 6,
   wherein, for those of presented transactions labeled with a same CoT and targeting a same coherency granule, the respective devices process the presented transactions in an order presented by the coherency interconnect, and
   wherein, for a pair of presented transactions labeled with different CoTs but targeting a same coherency granule, the respective devices process the pair of presented transactions in accord with a CoT-denominated order thereof.

8. The method of claim 3,
   wherein the coherency interconnect implements plural ordering points; and wherein the ordering is relative to other transactions received at a same ordering point.

9. The method of claim 1,
   wherein for each transaction that is a constituent of a particular instance of one of the supported operations, respective CoT labels are associated such that a first CoT label associated with a given transaction is precedence ordered with respect to a second CoT label associated with a predecessor of the given transaction, if any.

10. The method of claim 9,
    wherein for a set of supported operations and for all possible dependency chains of constituent transactions thereof, associated CoT values are collectively in accord with the acyclic precedence order.

11. The method of claim 9,
    wherein each of the constituent transactions of the particular operation instance is tagged, and thereby correlatable by the coherency interconnect with other constituent transactions of the particular operation instance.

12. The method of claim 1,
    wherein at least some of the supported operations include a data-type transaction that is a successor, in the acyclic precedence order, of an initiating address-type transaction;
    wherein data-type ones of the received transaction requests specify respective CoT labels; and
    wherein responsive to a subset of the received, CoT labeled data-type transaction requests, the coherency interconnect supplies corresponding CoT labeled grant indications, wherein by supplying a particular CoT labeled grant indication to a particular requesting device, the coherency interconnect grants unconditional availability of data path resources for a data-type transaction of the corresponding class from the particular requesting device and for all possible successor data-type transactions of the same operation.

13. The method of claim 1,
wherein the supported operations include as constituents address-type, address-response-type and data-type transactions wherein at least the address-type transactions are subject to a CoT label denominated request-grant protocol, and
wherein no address-response-type transaction ever requires a correlated address transaction to be retried.

14. The method of claim 13,
wherein at least a subset of the data-type transactions are subject to a CoT label denominated request-grant protocol.

15. The method of claim 13,
wherein address-response-type transactions are each associated with respective CoT labels but are not subject to a CoT label denominated request-grant protocol.

16. The method of claim 1,
wherein the devices include processors, memory controllers and bridges;
wherein the coherency interconnect implements separate address path and data path portions; and
wherein at least initiating address-type transactions seek to transit the address path portion are subject a CoT label denominated request-grant protocol.

17. The method of claim 1, further comprising:
transacting the supported operations amongst the devices without retry, at a transaction protocol layer, of any of the constituent transactions.

18. The method of claim 1,
wherein for at least some load-type ones of the supported operations, the constituent transactions include separate address-type, address response-type and data-type transactions.

19. An apparatus comprising:
a coherency manager for coupling between plural devices to support operations amongst the devices relative to a coherency domain of addressable memory locations, wherein at least some of the supported operations include plural constituent transactions, and wherein class of transaction (CoT) labels associated with respective constituent transactions of a particular supported operation differ, but are in accordance with an acyclic precedence order thereof of the constituent transactions;
a first set of interfaces of the coherency manager including signal paths for receiving transaction requests from respective ones of the devices, wherein, for at least address-type ones of the transaction requests, interfaces of the first set allow respective devices to specify respective CoT labels in correspondence with respective transaction requests; and
a second set of interfaces of the coherency manager including signal paths for supplying CoT labeled grant indications in correspondence with, and responsive to, a subset of the received, CoT labeled transaction requests, wherein supply of a particular CoT labeled grant indication to a particular device signifies unconditional grant to the particular device of availability of resources for a transaction of the corresponding class.

20. The apparatus of claim 19, configured as a system on a chip (SoC) and further comprising:
the plural devices, including at least one memory controller and plural processors, each with integrated cache memory,
wherein the coherency manager and the first and second interfaces thereof are operatively coupled between the devices, and wherein the supported operations are transacted amongst the devices without retry, at a transaction protocol layer, of any of the constituent transactions.

21. The apparatus of claim 19, further comprising:
a transaction table for representing status of constituent transactions of operations in flight in the coherency interconnect; and
decision logic operatively coupled to the transaction table and to the first and second interfaces, the decision logic operable to ensure that, if a particular one of the received transaction requests is granted, interconnect resources are available for the particular transaction requested and for all possible successor transactions thereof after accounting for current and possible successor transactions that are constituents of the operations already in flight in the coherency interconnect.

22. The apparatus of claim 19, further comprising:
separate address path and data path portions of the coherency manager, wherein at least some of the supported operations include a data-type transaction that is a successor, in the acyclic precedence order, of an initiating address-type transaction, the data-type transaction transiting the data path portion and the address-type transaction transiting the address path portion;
the first set of interfaces including signal paths for receiving data-type ones of the transaction requests and thereby allowing respective ones of the devices to specify respective CoT labels in correspondence with respective data-type transaction requests; and
the second set interfaces including signal paths for supplying CoT labeled grant indications in correspondence with, and responsive to, a subset of the received, CoT labeled data-type transaction requests, wherein supply of a particular CoT labeled grant indication to a particular device signifies unconditional grant to the particular device of availability of data path resources for a data-type transaction of the corresponding class and for all possible successor data-type transactions of the same operation.

23. The apparatus of claim 22,
wherein for at least some load-type ones of the supported operations, the constituent transactions include separate address-type, address response-type and data-type transactions.

24. An apparatus comprising:
a device suitable for coupling with a coherency manager that supports operations amongst multiple devices relative to a coherency domain of addressable memory locations, wherein at least some of the supported operations include plural constituent transactions, and wherein class of transaction (CoT) labels associated with respective constituent transactions of a particular supported operation differ, but are in accordance with an acyclic precedence order of the constituent transactions;
the device including an interface that includes respective signal paths for presenting the coherency manager with a CoT-denominated request to initiate individual instances of at least address-type ones of the constituent transactions and for receiving from the coherency manager CoT-denominated grants, the interface further including signal paths for supplying CoT-labeled address-type transactions to the coherency manager in correspondence with respective ones of the received CoT-denominated grants.

\* \* \* \* \*